US006685276B2

(12) United States Patent
Kenion

(10) Patent No.: US 6,685,276 B2
(45) Date of Patent: Feb. 3, 2004

(54) TIRE RIM PROTECTION DEVICE AND METHOD

(76) Inventor: Anthony Kenion, 1065 Dubose Dr., Norfolk, VA (US) 23504

( * ) Notice: Subject to any disclaimer, the term of this patent is extended or adjusted under 35 U.S.C. 154(b) by 0 days.

(21) Appl. No.: 10/131,608

(22) Filed: Apr. 25, 2002

(65) Prior Publication Data

US 2003/0201665 A1 Oct. 30, 2003

(51) Int. Cl.$^7$ .............................. B60B 7/00; B60J 1/20; B60J 3/00
(52) U.S. Cl. ........................... 301/37.103; 301/37.104; 160/370.21; 296/97.7
(58) Field of Search ................... 160/370.21; 296/97.7, 296/97.9; 301/37.101, 37.103, 37.104, 37.102, 37.31, 37.41, 37.34, 37.36, 37.106, 37.107; 118/505; D12/204, 213

(56) References Cited

U.S. PATENT DOCUMENTS

| | | | | |
|---|---|---|---|---|
| 1,403,446 A | * | 1/1922 | Rothmann | 280/156 |
| 3,192,896 A | * | 7/1965 | Irving | 118/505 |
| 4,784,440 A | * | 11/1988 | Fair | 301/37.103 |
| 4,874,206 A | * | 10/1989 | Sampson | 301/37.103 |
| 4,955,670 A | * | 9/1990 | Koller | 301/37.31 |
| 5,035,460 A | * | 7/1991 | Huang | 296/95.1 |
| 5,116,273 A | * | 5/1992 | Chan | 160/370.21 |
| 5,213,147 A | * | 5/1993 | Zheng | 160/370.21 |
| 5,267,599 A | | 12/1993 | Kim | |
| 5,423,599 A | * | 6/1995 | Sherod et al. | 301/37.103 |
| 5,435,630 A | | 7/1995 | Tucker | |
| 6,068,345 A | * | 5/2000 | Bressie | 301/37.103 |
| 6,179,387 B1 | * | 1/2001 | Nasset et al. | 301/37.102 |
| 6,412,878 B1 | * | 7/2002 | Bell et al. | 301/37.104 |
| 6,464,303 B2 | * | 10/2002 | Stembridge | 301/37.31 |
| 6,585,329 B2 | * | 7/2003 | Crump | 301/37.103 |

* cited by examiner

Primary Examiner—S. Joseph Morano
Assistant Examiner—Jason R. Bellinger
(74) Attorney, Agent, or Firm—Joseph E. Topmiller; Covington & Burling

(57) ABSTRACT

An apparatus for protecting a tire rim or hubcap is provided. A tire rim cover comprising a flexible round body and an elastic ring shaped element coupled to the round shaped body near the outer edge of the round body is provided. One or more clips coupled to the tire rim cover are also provided. The elastic ring shaped element is designed to surround the outer edge of a tire rim or hubcap and the clip is designed to be removably attached to the rim or hubcap to resist dislodging during use. A method for protecting a tire rim or hubcap using such a tire rim cover is also provided.

8 Claims, 5 Drawing Sheets

TIRE RIM PROTECTION DEVICE AND METHOD

BACKGROUND OF THE INVENTION

1. Field of the Invention

This invention generally relates to a device or method for protecting tire rims or hubcaps. More particularly, this invention relates to a cover that is positioned over a vehicle tire rim or hubcap to protect the rim or hubcap from cleaning sprays, polishes and the like.

2. Related Art

Many people derive significant pleasure from thoroughly cleaning their vehicle. One aspect of thoroughly cleaning a vehicle for some people is to apply a polish or similar oily substance to the tires in order to make the tire appear shiny. One such product that is commonly used is Armor All® Protectant which is widely available in many automotive and department stores. However, many consumers find it difficult to apply a sufficient coat of a tire spray or polish to the tires without also inadvertently applying some of the tire spray or polish onto the rim or hubcap of the tire. Among other reasons, it is undesirable to apply the tire spray or polish to the rim or hubcap of the tire because it creates a dulling effect on the rim or hubcap. Once the tire spray or polish has been inadvertently applied to the rim or hubcap of the tire, it often takes two to three additional washings to remove it from the rim or hubcap.

Thus, a need exists for an apparatus that is able to protect the rim or hubcap of a tire from the inadvertent application of various tire cleaning and polishing products so that the consumer is spared the extra and difficult step of removing such products from the tire rim or hubcap.

SUMMARY OF THE INVENTION

In one aspect, the present invention provides an apparatus for protecting the rim or hubcap of a tire. A tire rim cover is provided that comprises a flexible round shaped body and an elastic ring shaped member that is coupled to the round body. The elastic ring shaped member is design to surround the outer edge of the rim or hubcap of a tire. A clip is coupled to the tire rim cover and is designed to be removably attached to the tire rim or hubcap to resist accidental dislodging of the tire rim cover. Alternatively, one or more straps may be coupled to the back side of the tire rim cover, and the clip or clips may be coupled to the straps.

In another aspect, a method of using a tire rim protection device is provided. A tire rim cover comprising a flexible round shaped body and an elastic ring shaped member coupled to the round body is positioned adjacent to a tire rim. The elastic ring shaped member is positioned to surround, at least in part, the tire rim or hubcap of a tire. A clip, coupled to the tire rim cover is also provided. The clip is removably attached to the tire rim or hubcap and resists accidental dislodging of the tire rim cover.

DETAILED DESCRIPTION OF THE PREFERRED EMBODIMENTS

Reference now will be made to the present preferred embodiments of the invention, examples of which are illustrated in the accompanying drawings.

Figure 1:
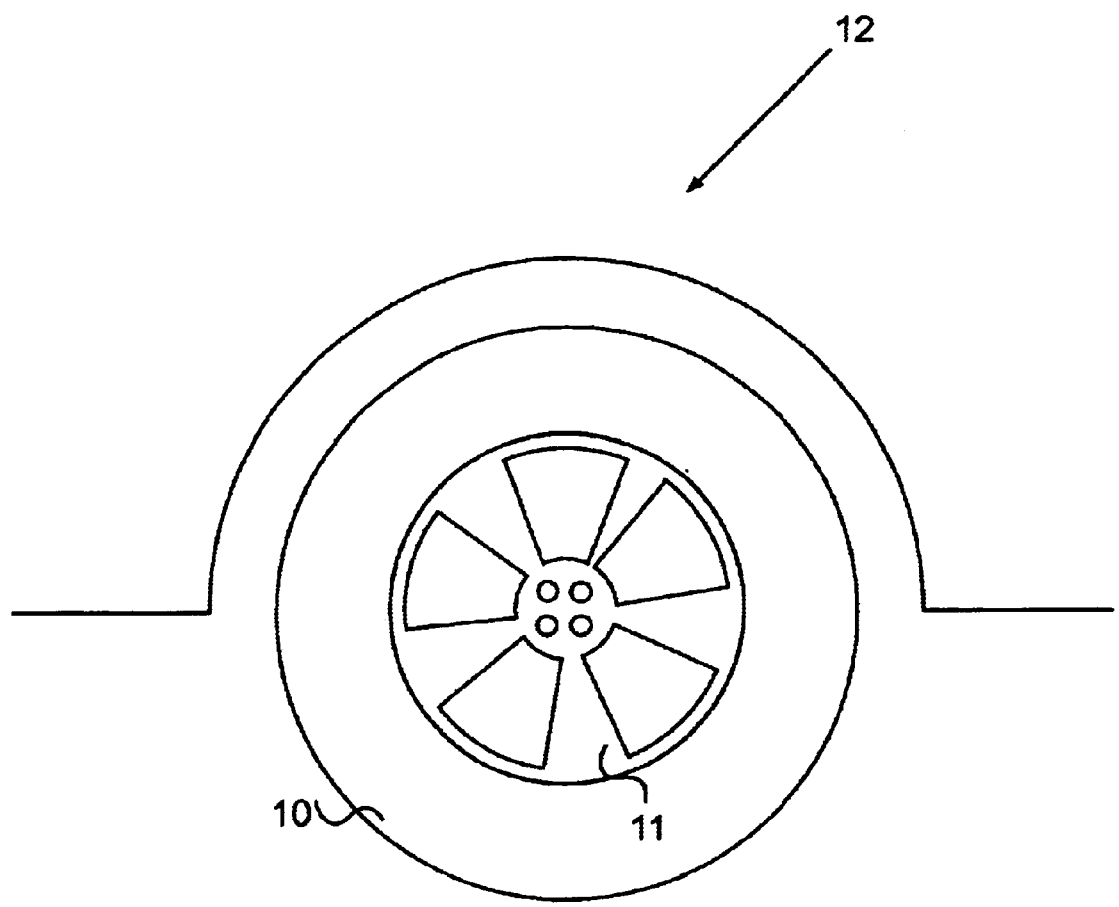
FIG. 1 is an illustration of a portion of a vehicle, including a tire and tire rim.

FIG. 1 shows the front portion of a vehicle 12, including a tire 10 and a tire rim 11. One feature of the present invention is to provide an apparatus for covering the tire rim 11 so that a consumer can apply tire spray, polish or other cleaning products to tire 10 without getting any of the product on tire rim 11. As would be understood by one skilled in the art, the present invention is not limited to any particular vehicle, and could be used for a wide range of vehicle tires where there is a rubber or similar material tire and a rim or a hubcap. Examples include, but are not limited to tires on trucks, cars, motorcycles, bicycles, tractors, and the like. As would also be understood by one skilled in the art, the present invention is equally applicable to tires with rims or hubcaps. The terms "rim" or "tire rim" as used herein should be understood to include rims, hubcaps, and similar devices.

Figure 2:
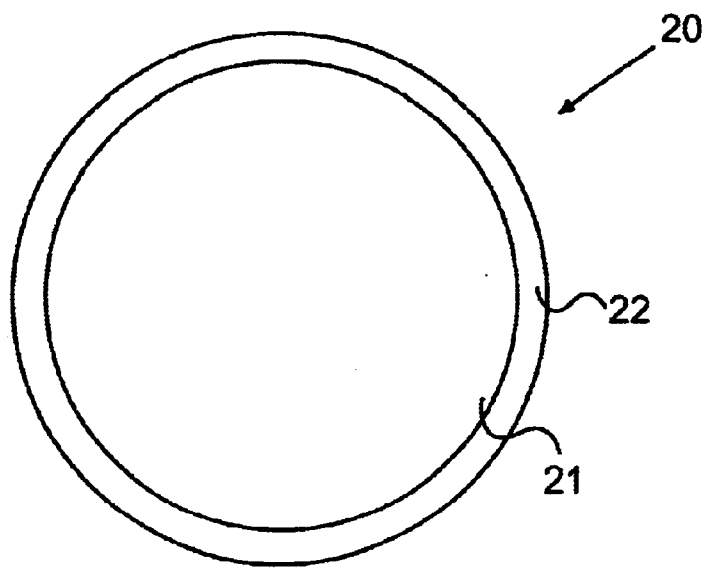
FIG. 2 is an illustration of a front view of a tire rim protection device according to an embodiment of the present invention.

FIG. 2 shows a front view of an embodiment of a tire rim protection device according to the present invention. In this preferred embodiment, tire rim cover 20 comprises a generally round shaped body 21. By "round," the applicant means any generally rounded shape including shapes that are generally round but somewhat oblong, elliptical or otherwise not perfect circles. Round body 21 is preferably flexible, relatively thin and impervious to a wide range of chemicals that may be applied to tires in order to clean or polish them. In a preferred embodiment, round body 21 is of a similar construction as that of sun-shades, which are commonly used for cars to prevent the interior of the car from getting too hot when parked in the sun. An example of a sun-shade may be found in U.S. Pat. No. 5,267,599 to Kim ("Kim"), the entirety of which is hereby incorporated by reference. As described in Kim, sun-shades may be made of a foam or similar internal material and an aluminum foil or other reflective material surrounding the foamy material. A film coating, such as mylar, may also be applied to the exterior of the reflective material. The foam has insulative properties and is flexible but somewhat self-supporting or rigid. This material is also advantageous in that it is relatively easy to cut. Thus, round body 21 made be made of such a foamy material surrounded by an aluminum foil and may have a mylar coating. However, the present invention is not limited to any particular materials and round body 21 may be made from any number of materials so long as the material is flexible and relatively impervious to most cleaning and polishing materials. Tire rim cover 20 may be made in any number of sizes depending on the size of the tires for which the device will be used. Preferably, tire rim cover 20 is sized to cover a 13, 14, 15, 16, 17, or 18 inch rim or hubcap.

According to the embodiment depicted in FIG. 2, a ring shaped element 22 is coupled to the round body 21. Ring shaped element 22 is preferably sewn near the outer edge of round body 21 using techniques known in the art. Alternatively, ring shaped element 22 may be coupled to round body 21 using an adhesive or in any number of ways known in the art to attach such materials. Ring shaped element 22 preferably comprises an elastic material. This allows ring shaped element 22 to surround the rim of a tire (such as tire rim 11 of FIG. 1) and effect a seal around the outer edge of the rim such that tire sprays, polishes or other cleaning materials are substantially prevented from leaking onto a tire rim when applied to a tire.

Figure 3:
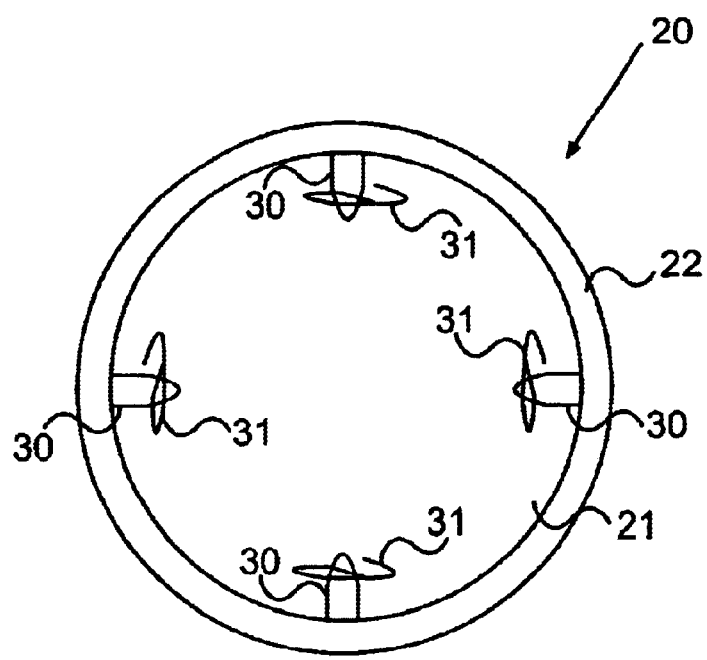
FIG. 3 is an illustration of a back view of the embodiment shown in FIG. 2.
Figure 4:
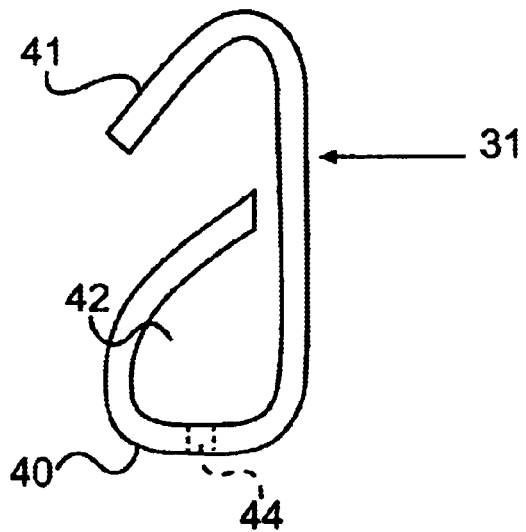
FIG. 4 is an illustration of an embodiment of a clip according to the present invention.

FIG. 3 shows a back view of an embodiment of tire rim cover 20 according to the present invention. A number of clips 31 are coupled to the tire rim cover 20 using a short elastic member 30. Elastic member 30 may be affixed to either ring shaped element 22 or round body 21. The manner in which elastic member 30 is affixed to tire rim cover 20 is not critical. One preferred method for connection is sewing. Clips 31 are designed so that they are capable of being removably attached to the rim of the tire to resist the tire rim cover 20 from becoming dislodged during use but removable after the tire has been cleaned. The elastic member 30 assists the consumer in positioning the clip so that it engages the rim. FIG. 4 shows a preferred design for clip 31. Edge 40 of clip 31 engages elastic member 30, such as by looping elastic member 30 through the eye 42 of clip 31. Alternatively, a hole 44 may be provided through the material of clip 31, and elastic member 30 may be threaded through that hole. Edge 41 engages the tire rim during use. Preferably, four clips are provided and are evenly spaced around the circumference of tire rim cover 20. However, the present invention is not limited to a particular number or arrangement of clips 31, so long as the clip or clips used are sufficient to provide resistance to accidental dislodging of tire rim cover 20 during use.

Figure 5:
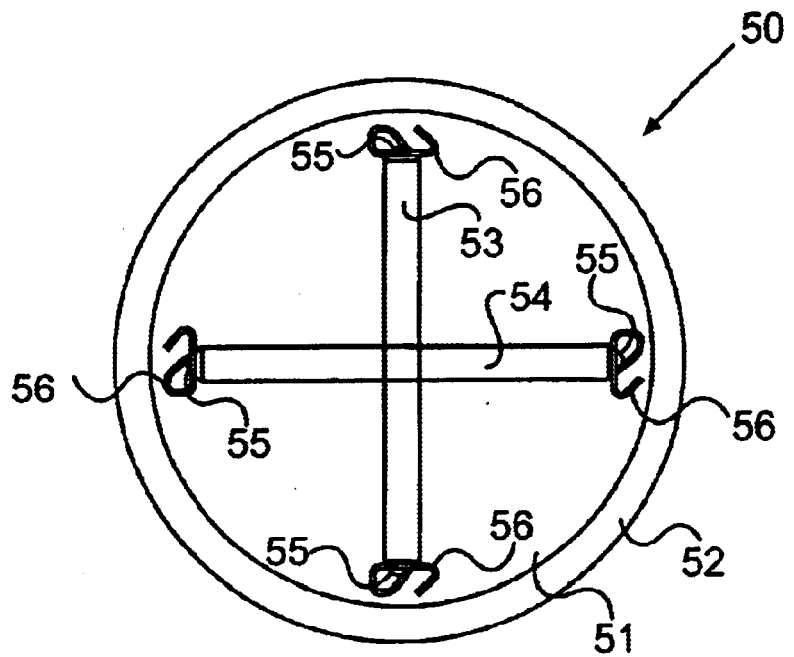
FIG. 5 is an illustration of a back view of a tire rim protection device according to another embodiment of the present invention.
Figure 6:
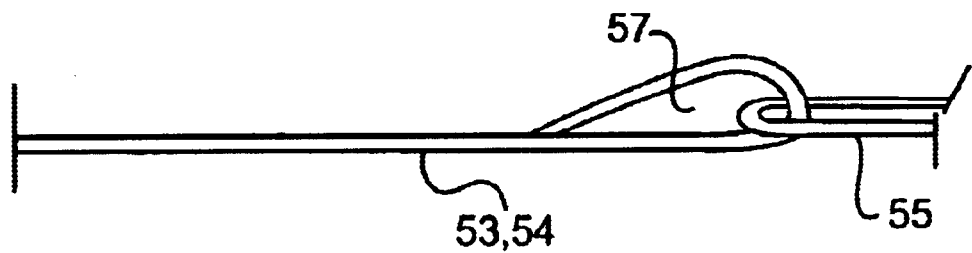
FIG. 6 is an illustration of a strap arrangement according to an embodiment of the present invention.

FIG. 5 shows the back view of another preferred embodiment of the present invention. (The front view is substantially similar to FIG. 2.) Similar to the embodiment described above, in this preferred embodiment, tire rim cover 50 comprises a round body 51 and ring shaped element 52. In this embodiment, straps 53 and 54 are attached to the back side of tire rim cover 50, such as by sewing. Straps 53 and 54 are preferably 1 inch in width and 1 foot in length. Straps 53 and 54 are preferably made from a material similar to the material from which conventional automotive seatbelts are made. In a preferred embodiment, straps 53 and 54 are arranged in a generally perpendicular relationship, as shown in FIG. 5. The ends of straps 53 and 54 may be folded back and sewn in order to form a pocket 57 (shown in FIG. 6). At the ends of straps 53 and 54 are elastic elements 55, which may be made of an elastic material that is relatively strong or reinforced, such as a braided elastic material (often used to hold back hair). If straps 53 and 54 are provided with pockets 57, elastic elements 55 may be threaded through the pockets 57 in order to connect elastic elements 55 to the end of the strap (shown in FIG. 6). Alternatively, elastic elements 55 may be sewn onto the ends of straps 53 and 54. In any event, elastic elements 55 are preferably pre-stretched so that they are somewhat taut in order to avoid excessive slack when clips 56 are removably attached to a tire rim or hubcap. Clips 56 are connected to elastic elements 55 on one end and are designed to be removably attached to a tire rim on the other end. Clips 56 are preferably similar to clips 31.

Figure 7:
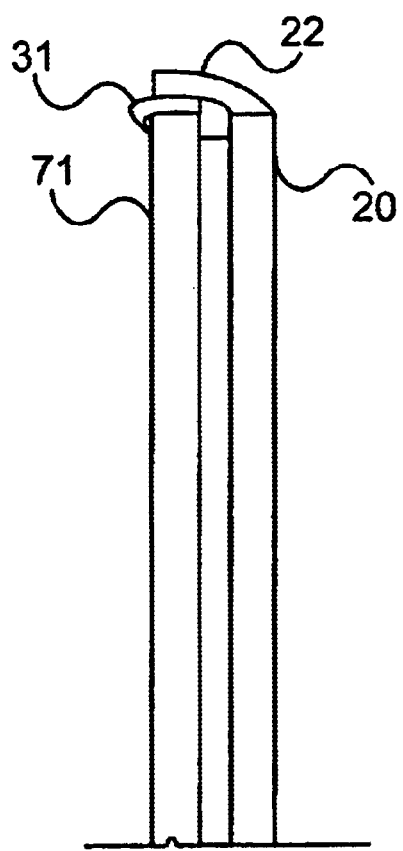
FIG. 7 is a side view of a tire rim protection device engaged with a tire rim according to an embodiment of the present invention.
Figure 8:
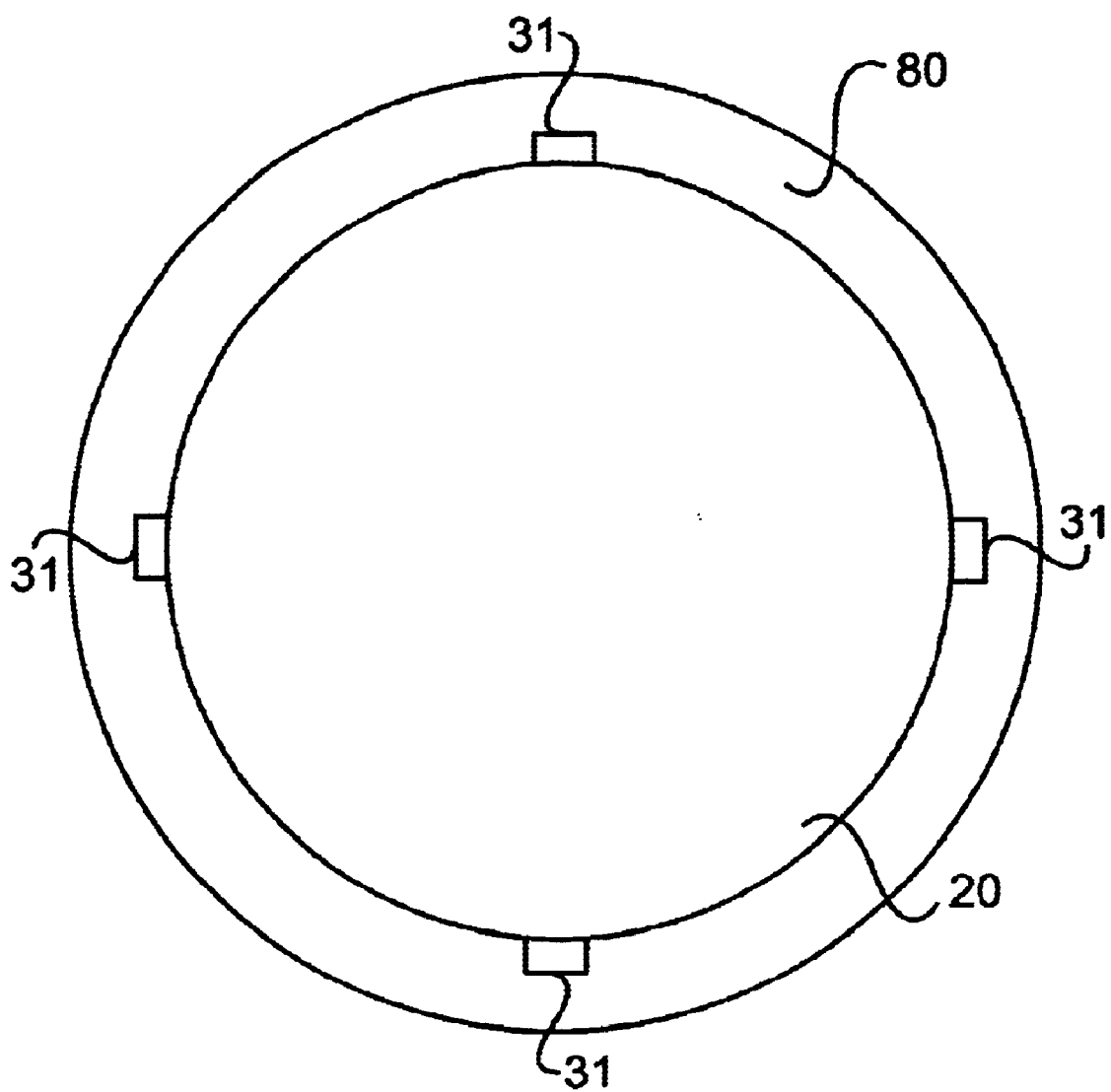
FIG. 8 is a front view of a tire rim protection device engaged with a tire rim according to an embodiment of the present invention.

Now will be described a method for protecting a tire rim or hubcap according to the present invention. In this method, a tire protection device generally similar to that described above and shown in FIGS. 2–4 is used. The method may also be used with other tire protection devices according to the present invention, such as the embodiment shown in FIGS. 5 and 6. Tire rim cover 20 is positioned near a tire, such as that shown in FIG. 1. Ring shaped element 22 is positioned such that it surrounds at least a portion of the tire rim. Preferably, ring shaped element 22 should be positioned to surround all or substantially all of the tire rim in order to protect the tire from over spray or run off from various polish or cleaning products that may be applied to the tire. In addition, clips 31 are removably attached to the tire rim in order to resist accidental dislodging of the tire protection device during use. A side view of a tire rim protection device engaged to tire rim 71 according to a method of the present invention is shown in FIG. 7. Ring element 22 substantially covers tire rim 71. Clip 31 are removably attached to rim 71 to prevent accidental dislodging. A front view of an engaged tire protection device is shown in FIG. 8. The tire rim protection device preferably substantially covers the tire rim so that tire 80 is exposed but rim 71 is not.

Although particular embodiments of the invention have been described and illustrated herein, it is recognized that modifications and variations may readily occur to those skilled in the art and consequently it is intended that the claims be interpreted to cover such modifications and equivalents.

What is claimed as new and desired to be protected by Letters Patent of the United States is:

1. Apparatus for protecting a wheel rim or hubcap comprising:

a wheel rim cover comprising a flexible round shaped body and an elastic ring shaped element coupled to the round shaped body near an outer edge of the round shaped body;

a strap coupled to the wheel rim cover; and a clip coupled to the strap;

wherein the elastic ring shaped element is designed to surround an outer edge of the wheel rim or hubcap, and the clip comprises a portion that hooks around the wheel rim or hubcap to be removably attached to the wheel rim or hubcap.

2. The apparatus of claim 1, wherein the clip is coupled to the strap using an elastic member.

3. The apparatus of claim 1, further comprising one additional strap coupled to the wheel rim cover, wherein the two straps are arranged in a perpendicular relationship.

4. The apparatus of claim 3, wherein the apparatus further comprises a total of four clips, wherein each clip is coupled to one of the straps near an end of said strap, and each clip is spaced at approximately 90 degree intervals.

5. The apparatus of claim 1, further comprising at least one additional clip coupled to the strap.

6. The apparatus of claim 5, wherein the clips are spaced at even intervals.

7. The apparatus of claim 1, wherein the clip is coupled to the strap near an end of the strap.

8. The apparatus of claim 1 wherein the round shaped body comprises a foamy material and an aluminum foil surrounding the foamy material.

* * * * *